(12) United States Patent
Williams

(10) Patent No.: US 12,478,045 B1
(45) Date of Patent: Nov. 25, 2025

(54) SQUIRREL DETERRENT DEVICE

(71) Applicant: Wesley M. Williams, Rochester, NY (US)

(72) Inventor: Wesley M. Williams, Rochester, NY (US)

( * ) Notice: Subject to any disclaimer, the term of this patent is extended or adjusted under 35 U.S.C. 154(b) by 0 days.

(21) Appl. No.: 19/251,199

(22) Filed: Jun. 26, 2025

(51) Int. Cl.
*A01K 39/01* (2006.01)

(52) U.S. Cl.
CPC ............................... *A01K 39/0113* (2013.01)

(58) Field of Classification Search
CPC ..... A01K 39/0113; A01G 13/10; A01M 29/30
USPC ................................................ 119/57.9, 52.3
See application file for complete search history.

(56) References Cited

U.S. PATENT DOCUMENTS

| | | | | |
|---|---|---|---|---|
| 1,879,813 A * | 9/1932 | Molitor | ................... | A01G 13/28 |
| | | | | 47/32.4 |
| 2,525,234 A * | 10/1950 | Mucke | ..................... | B63B 21/12 |
| | | | | 114/221 R |
| 2,891,508 A * | 6/1959 | Bower | ................ | A01K 39/0113 |
| | | | | 114/221 R |
| 4,031,856 A | 6/1977 | Chester | | |
| 5,289,796 A * | 3/1994 | Armstrong | ........... | A01K 39/012 |
| | | | | 119/59 |
| 5,355,835 A * | 10/1994 | Freed | .................. | A01K 39/0113 |
| | | | | 248/162.1 |
| 5,394,641 A * | 3/1995 | Danca | ................ | A01K 39/0113 |
| | | | | 43/108 |
| 5,568,789 A * | 10/1996 | Koenig | .............. | A01K 39/0113 |
| | | | | 119/57.9 |
| 6,401,658 B1 * | 6/2002 | Teets | ................... | A01K 39/0113 |
| | | | | 119/52.2 |
| 6,532,894 B2 | 3/2003 | Johnson | | |
| 6,640,746 B1 | 11/2003 | Lund | | |
| 7,574,976 B2 * | 8/2009 | Ellen | ................... | A01K 39/0113 |
| | | | | 119/52.3 |
| 8,104,430 B1 * | 1/2012 | Powell, Jr. | .......... | A01K 39/0113 |
| | | | | 119/52.3 |
| 8,413,605 B2 * | 4/2013 | Baynard | ............. | A01K 39/0113 |
| | | | | 119/52.3 |
| 10,349,634 B2 | 7/2019 | Rawls | | |
| 2001/0032593 A1 * | 10/2001 | Johnson | ............. | A01K 39/0113 |
| | | | | 119/52.3 |
| 2006/0102083 A1 * | 5/2006 | Ellen | .................. | A01K 39/0113 |
| | | | | 119/57.9 |
| 2017/0318791 A1 * | 11/2017 | Rawls | ................ | A01K 39/0113 |

* cited by examiner

*Primary Examiner* — Zoe Tam Tran
(74) *Attorney, Agent, or Firm* — Jong Patent Firm; Cheng Ning Jong; Tracy P. Jong

(57) ABSTRACT

An animal deterrent device configured to be mountable to a pole, the device including a sleeve and a baffle movably mounted to the sleeve. The sleeve includes a lumen, a top end and a bottom end, the sleeve configured to be mountable around the pole such that the sleeve is movable along a first portion of the length of the pole, wherein the sleeve is supported on the pole using an elastic member. The baffle is movably mounted to the top end of first sleeve. When the weight of the animal is applied to the sleeve, the sleeve drops with respect to the pole to dissuade the animal from ascending the pole and when the weight of the animal is applied to the baffle, the baffle drops and wobbles to cause the animal to lose its balance to dissuade the animal from using the baffle as a perch.

20 Claims, 11 Drawing Sheets

SQUIRREL DETERRENT DEVICE

BACKGROUND OF THE INVENTION

1. The Field of the Invention

The present invention relates to a squirrel deterrent device. More specifically, the present invention is directed to a squirrel deterrent device configured to be used with a pole supporting one or more bird feeders.

2. Background Art

U.S. patent Ser. No. 10/349,634 to Rawls (Hereinafter Rawls) discloses implementations of a squirrel deterrent kit. The squirrel deterrent kit may be used to prevent animals from climbing a pole to gain access to the bird feeder mounted thereon. In some implementations, the squirrel deterrent kit may include a sleeve member, a self-retracting reel, and a pole mounted fastener, e.g., a hook. In some implementations, the self-retracting reel may be positioned and/or secured within a cavity of the sleeve member. In some implementations, the pole-mounted fastener may be configured to attach to an adapter, e.g., a ring, secured on the distal end of the line of the self-retracting reel. In this way, the self-retracting reel may be used to slidably connect the sleeve member to the pole. In some implementations, the sleeve member may include an elongated cylindrical stem having a dome shaped head. In some implementations, the sleeve member may include a longitudinally extending vertical slit therein. Rawls discloses a sleeve member and a fixed head portion disposed thereon. Rawls further discloses a reel configured to movably support the sleeve member and head portion. However, it is possible that a squirrel may still manage to land on the head portion and use it as a momentary perch to either continue ascending the pole or as a launch point toward a bird feeder, as the only movement imparted by the deterrent kit may be the downward displacement of the head portion, i.e., an action that may not be sufficiently unpredictable to effectively deter the squirrel.

U.S. Pat. No. 6,532,894 to Johnson (Hereinafter Johnson) discloses an anti-squirrel device for pole mounted bird feeders consisting of a section of tubing slidably mounted around the pole suspended by an elastic band. In Johnson, it appears that an elastic band is used to allow a section of tubing to drop downwardly under the weight of a squirrel. However, if a squirrel manages to bypass this section of tubing, the device lacks an additional component capable of preventing or discouraging the squirrel's continued ascent along the pole.

U.S. Pat. No. 4,031,856 to Chester (Hereinafter Chester) discloses a squirrel-proof post including a post supporting a bird platform such as a bird feeder or bird house and has an axially elongated sleeve slidable on the post. A mechanism is provided to bias the sleeve toward the top of the post, such as a counterweight inside the post which is connected to the sleeve by a line which passes over a pulley at the top of the post. The counterweight is sufficient to lift the sleeve to the top of the post. However, when a squirrel climbs up the post and onto the sleeve, the weight is insufficient to support the combined weight of the sleeve and the squirrel, whereupon the sleeve carrying the squirrel will start to slide down the post and the squirrel will jump off and return to ground level. The counterweight will now lift the sleeve back to the top of the post. If the squirrel tries again to climb the post, the process will be repeated and the squirrel will be returned to the ground. In Chester, it appears that a plastic cord and a counterweight are employed to allow the sleeve to drop downwardly under the weight of a squirrel and to return the sleeve to its original position once the squirrel has dismounted. However, if a squirrel manages to bypass the sleeve and reach the feed platform, Chester's post lacks any additional component capable of encouraging the squirrel to leave the feed platform.

U.S. Pat. No. 6,640,746 to Lund (Hereinafter Lund) discloses a squirrel deterrent assembly including a pole member supporting a bird feeding device. A biasing spring member having first and second ends, encircles a portion of the pole member and is secured thereto at the first end thereof. An axially elongated sleeve member surrounds the spring member and the portion of the pole member, with the sleeve member secured to the spring member at the second end thereof. A squirrel grasping the sleeve member causes an up and down movement thereof, relative to the pole member, thereby frightening the animal off the assembly. In Lund, it appears that a spring is used to allow a sleeve member to drop downwardly under the weight of a squirrel. However, if a squirrel manages to bypass this section of tubing, the device lacks an additional component capable of preventing or discouraging the squirrel's continued ascent along the pole member.

There exists a need for a squirrel deterrent system, e.g., a barrier, that introduces instability to a pole to which the barrier is mounted to dissuade a squirrel from climbing up the pole to reach a pole-mounted bird feeder and to dissuade a squirrel for using the barrier as a perch while accessing the pole-mounted bird feeder.

SUMMARY OF THE INVENTION

In accordance with the present invention, there is provided an animal deterrent device configured to be mountable to a pole to dissuade the use of the pole by an animal, the animal deterrent device including:
(a) a first elastic member including an unstretched length;
(b) a first sleeve including a lumen, a top end and a bottom end, the first sleeve configured to be mountable around the pole such that the first sleeve is movable along a first portion of the length of the pole, wherein the first sleeve is supported on the pole by connecting the bottom end of the first sleeve through the lumen to a portion of the pole;
(c) a baffle configured to be movably mounted to the top end of the first sleeve, wherein when the weight of the animal is applied to the first sleeve, the length of the first elastic member expands to cause the first sleeve to drop with respect to the pole to dissuade the animal from ascending the pole and when the weight of the animal is applied to the baffle directly, the length of the first elastic member expands to cause the baffle to drop and wobble to cause the animal to lose its balance to dissuade the animal from using the baffle as a perch.

In one embodiment, the first elastic member is constructed from a rubber band. In one embodiment, the first elastic member includes ethylene propylene diene monomer (EPDM). In one embodiment, the baffle is configured to be movably mounted to the top end of the sleeve using one or more second elastic members. In one embodiment, the baffle is shaped as a truncated cone. In one embodiment, the truncated cone includes a larger diameter of about 10 inches to about 12 inches. In one embodiment, at least one of the baffle and the first sleeve is constructed from aluminum. In one embodiment, the first sleeve includes an inner diameter of about 1 inch to about 1.5 inches and a length of about 20 to about 21 inches. In one embodiment, the animal deterrent device further includes a second sleeve including an upper half and a bottom half, the second sleeve configured to be mountable around the first sleeve such that the second sleeve is movable along a second portion of the length of the pole, wherein the second sleeve is supported on the pole by connecting a first end of a third elastic member to the pole and a second end of the third elastic member to a location at the upper half of the second sleeve. In one embodiment, the second sleeve includes an inner diameter of about 2 to about 2.5 inches and a length of about 20 to about 21 inches. In one embodiment, the unstretched length is about 12 to about 14 inches.

An object of the present invention is to provide a deterrent device to prevent squirrels from climbing up a pole useful for supporting one or more bird feeders.

Another object of the present invention is to provide a deterrent device that operates in a non-habituating and seemingly unpredictable manner from the perspective of a squirrel or other animal, thereby increasing its effectiveness in startling or dissuading repeated attempts at access.

Another object of the present invention is to provide a pole-mounted deterrent device that dissuades a squirrel from using it as a perch while accessing a pole-mounted bird feeder.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—animal deterrent device
4—first sleeve
6—baffle, e.g., truncated cone
8—first elastic member, e.g., rubber band
10—second elastic member, e.g., rubber band
12—material, e.g., elastic material, e.g., rubber band, flexibly connecting baffle and sleeve
14—top end of first sleeve
16—bottom end of first sleeve
18—pole
20—bird feeder
22—squirrel
24—lap edge
26—lap edge aperture
28—baffle opening edge aperture
30—clamp
32—attachment point
34—smaller diameter
36—larger diameter
38—height of baffle
40—second sleeve
42—knot
44—fastener
46—glue
48—tilt angle of cone
50—lumen of first sleeve
52—gap
54—upper half of second sleeve
56—lower half of second sleeve Particular Advantages of the Invention The present squirrel deterrent device, when coupled to a pole supporting one or more bird feeders, includes multiple components that function in ways contrary to the expectations of squirrels, thereby discouraging them from further attempts to ascend the pole to access the bird feeders. For example, due to the sensitivity of the sleeve to the weight of a squirrel, when a squirrel clings to the sleeve in an attempt to climb the pole, the sleeve descends rapidly, disorienting the squirrel and causing it to lose its grip and fall. Additionally, since the cone is flexibly attached to the sleeve, if a squirrel lands on or otherwise makes contact with the cone, it tips unpredictably, further deterring the squirrel from continuing its ascent. In one embodiment, the sleeve and/or cone are constructed from a material of sufficient hardness, e.g., aluminum, so that a squirrel cannot easily grip the surface, providing an additional barrier to climbing.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
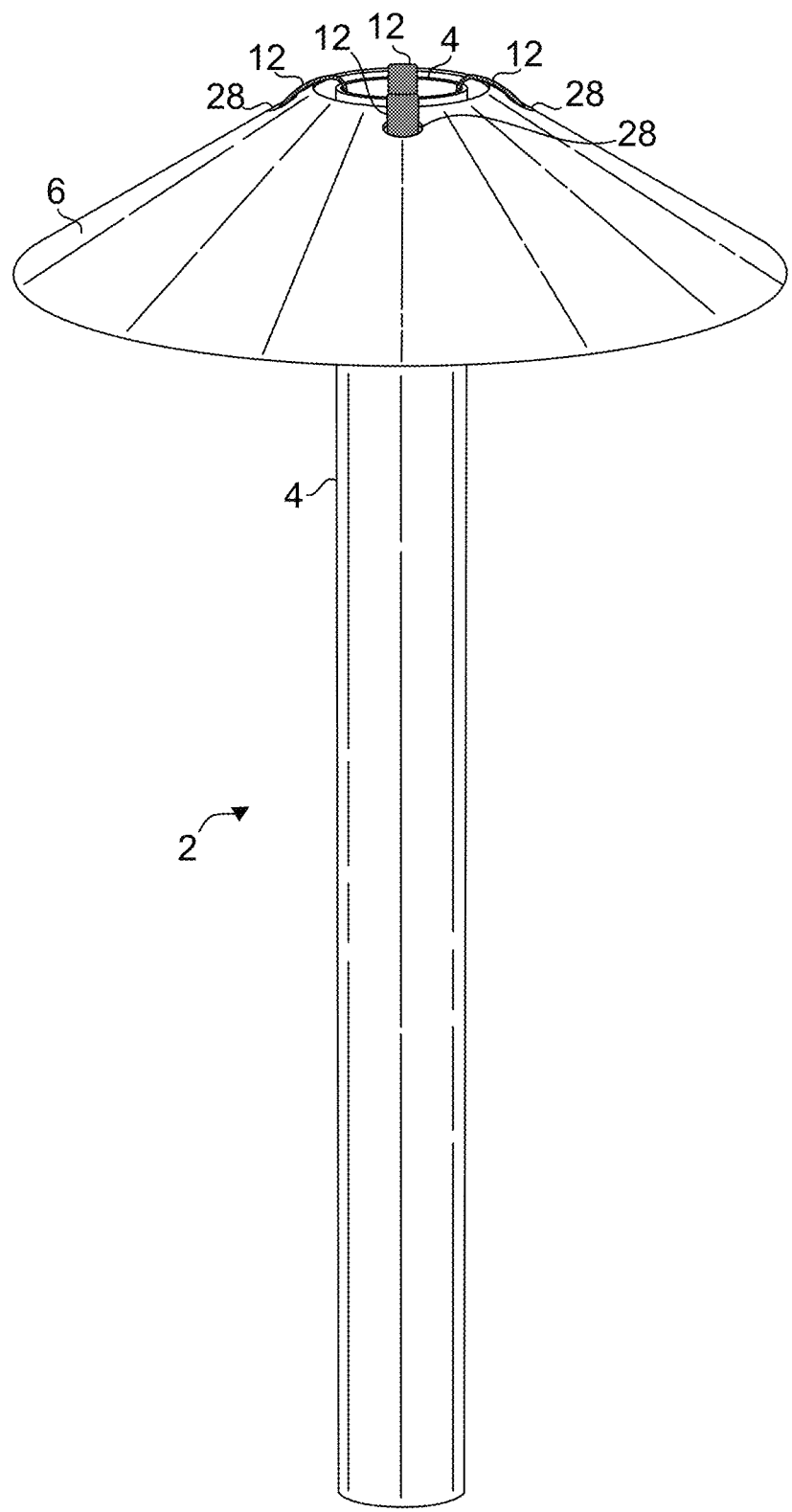
FIG. 1 is a top perspective view of a squirrel deterrent device, depicting a sleeve and a cone connected to the sleeve.
Figure 2:
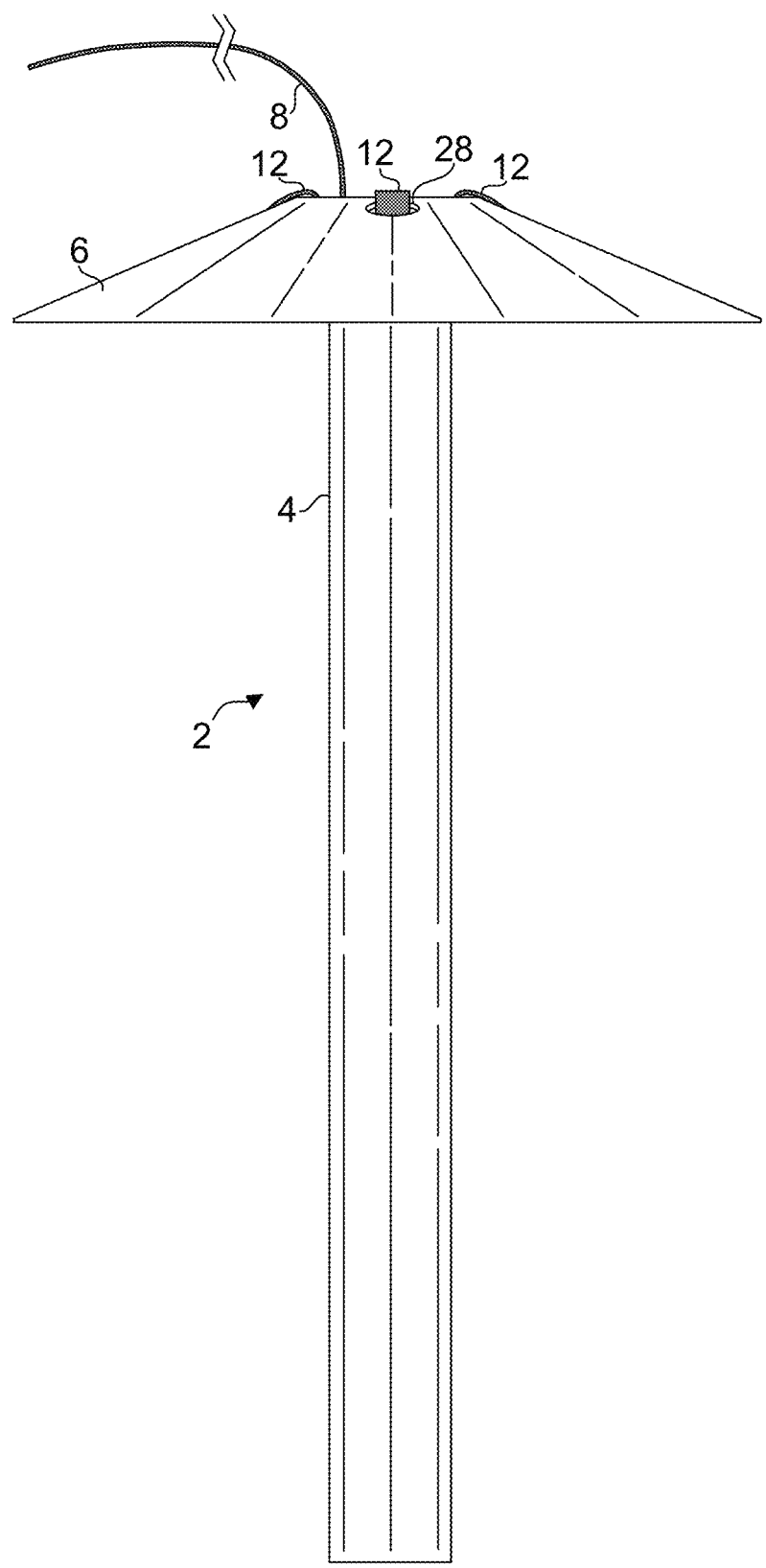
FIG. 2 is a side view of the squirrel deterrent device with one end of an elastic member shown disposed through the cone of the squirrel deterrent device.
Figure 3:
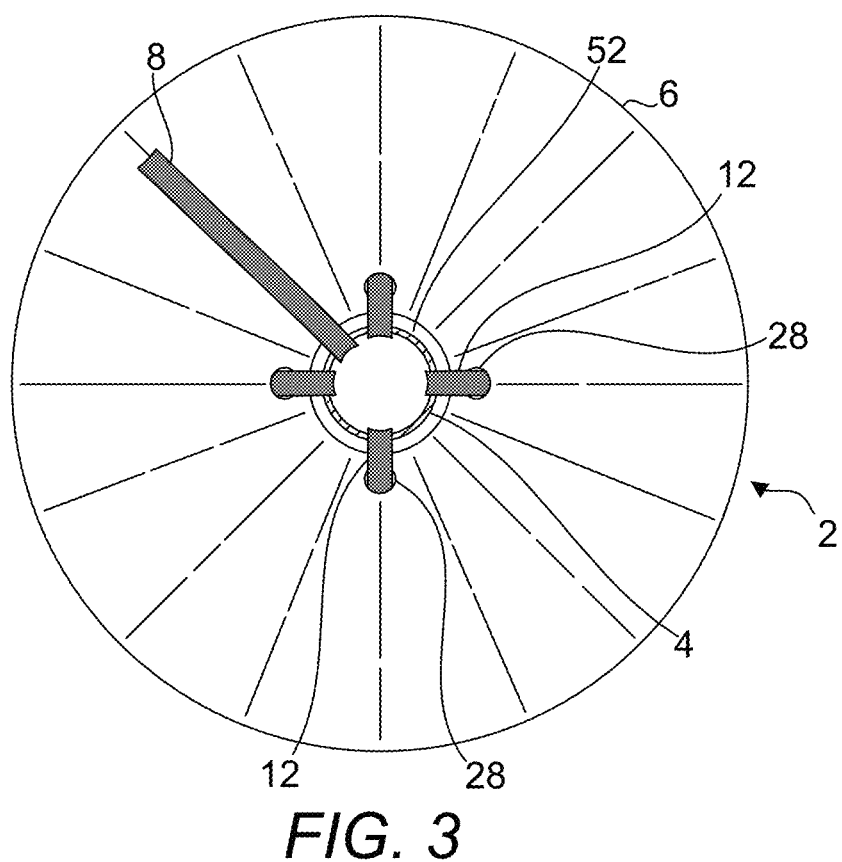
FIG. 3 is a top view of the squirrel deterrent device thereof.
Figure 4:
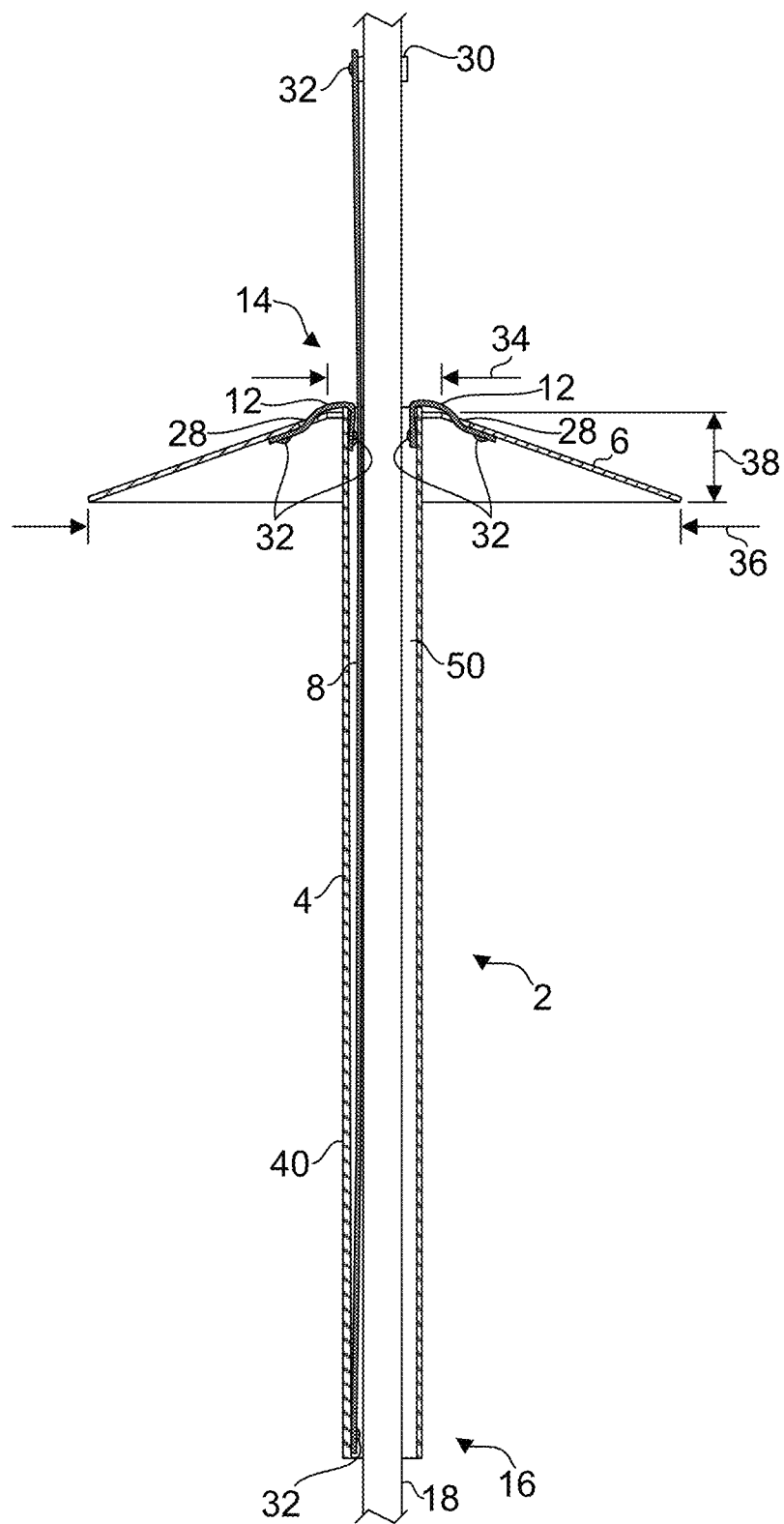
FIG. 4 is a side cross-sectional view of the squirrel deterrent device thereof, depicting a manner in which the squirrel deterrent device is mounted to a pole.

FIG. 1 is a top perspective view of a squirrel deterrent device 2, depicting a sleeve and a cone connected to the sleeve. FIG. 2 is a side view of the squirrel deterrent device with one end of an elastic member 8 shown disposed through the cone 6 of the squirrel deterrent device 2. FIG. 3 is a top view of the squirrel deterrent device 2 thereof. FIG. 4 is a side cross-sectional view of the squirrel deterrent device 2 thereof, depicting a manner in which the squirrel deterrent device is mounted to a pole 18. The device 2 is configured for preventing small animals, e.g., squirrels and chipmunks from gaining access to birdfeeders mounted on a pole, e.g., a vertical metal pole and it utilizes a combination of elastic and lightweight, weather-resistant components to dislodge and discourage animals from climbing or perching on the pole and to protect birdfeeder/s suspended from it, by movement of the sleeve, the increasing distance of the sleeve from a birdfeeder and tipping of a baffle mounted atop the sleeve. The device 2 is configured to be mountable to a pole to dissuade the use of the pole by a squirrel. The device 2 includes a first elastic member 8, a first sleeve 4, and a baffle 6 configured to be movably or flexibly mounted to the top end of the first sleeve 4. Referring to FIG. 3, the baffle 6 is configured to be movably mounted to the top end of the sleeve using a plurality of second elastic members 10, e.g., four second elastic members 10. The second elastic members 10 are shown to be equally-spaced about the top opening of the baffle 6, e.g., truncated cone, although they need not be equally-spaced about the opening, provided that an alternative arrangement of the second elastic members 10 still allows the cone 6 to tip towards the portion of the cone at which an animal's weight is applied. The top opening of the truncated cone 6 allows a gap 52 to form between the cone 6 and the first sleeve 4 such that the cone 6 can tip with respect to the sleeve 4 without interference from the first sleeve 4. In the embodiment shown throughout, four apertures 28 are disposed about the periphery of the top opening. An elastic material 12, e.g., rubber band is used at each aperture 28 to secure a portion of the baffle 6 to the first sleeve 4 while allowing the baffle 6 to move relative to the first sleeve 4. Here, one end of a rubber band 12 is threaded through an aperture 28 and secured to a bottom surface of the baffle 6 with an adhesive. The second end of the rubber band 12 is brought over the top periphery of the upper end of the first sleeve 4 and secured to an inner surface of the first sleeve 4. The first elastic member 8 includes an unstretched length of about 12 to about 14 inches. The term "unstretched length" is used herein to mean the length of the first elastic member 8 when no pulling force is applied to the first elastic member 8. It shall be noted that this is not the same as the length of the first elastic member 8 upon installation of the device 2. The first sleeve 4 includes a lumen 50, a top end 14 and a bottom end 16. The first sleeve 4 is configured to be mountable around the pole 18 such that the first sleeve 4 is movable along a portion of the length of the pole 18, wherein the first sleeve 4 is supported on the pole 18 by connecting the bottom end 16 of the first sleeve through the lumen 50 to a portion of the pole 18. Referring to FIG. 4, one end of the rubber band 8 is affixed to a position above the baffle 6 at an attachment point 32, while the other end is attached to the first sleeve 4 via another attachment point 32. It shall be noted that the lower end of the rubber band 8 is bonded to an inner surface of the first sleeve 4 to maintain tension and proper alignment. Upon mounting to a pole and when the weight of the animal is applied to the first sleeve 4, the length of the first elastic member 8 expands to cause the first sleeve 4 to drop with respect to the pole 18 to dissuade the animal from ascending the pole and when the weight of the animal is applied to the baffle directly, the length of the first elastic member 8 expands to cause the baffle to drop and wobble to cause the animal to lose its balance to dissuade the animal from using the baffle 6 as a perch. Referring to both FIGS. 3 and 4, although the first elastic member 8 appears to interfere with a second elastic member 12 and an attachment point 32, such depiction of these components are merely used for the purpose of clarifying the threading of the first elastic member 8 through the top opening of the cone and the lumen of first sleeve 4. In reality, the first elastic member 8 is angularly offset from a second elastic member 12 to avoid such interference. In one embodiment, the first sleeve 4 includes an inner diameter of about 1" to about 1.5 inches, providing sufficient clearance around the pole, and a length of about 20 to about 21 inches.

In one embodiment, the baffle 6 and the first sleeve 4 are each formed from aluminum, selected for its low weight, strength, durability, resistance to weathering or corrosion, resilience to damage from animal activity, and sensitivity to applied animal weight. Unlike plastics, aluminum is not susceptible to cracking and brittleness, ultraviolet (UV) degradation, or rodent gnawing, making it ideal for long-term outdoor use.

In one embodiment, the first elastic member 8 is formed from a highly stretchable and weather-resistant rubber band, selected in lieu of more complex mechanical systems such as reels, springs, or pulleys, which may be more prone to suffering from wear and environmental degradation. The use of a rubber band provides a simplified and durable solution, as it is less susceptible to failure resulting from environmental exposure, e.g., rain, snow, and temperature extremes, or mechanical wear. Applicant has discovered that a rubber band sufficiently sensitive to respond to the addition of weight to the device 2 is ethylene propylene diene monomer (EPDM) having a maximum elasticity at 1500 psi and breaking strength of 12 lbs.

The primary structural elements of the device include a sleeve or tube, a tiltable truncated cone, and at least one highly distensible rubber band for movably connecting the truncated cone to the sleeve. These components work in concert to create a destabilizing, responsive system that reacts to the weight of small animals while they come in contact with the device. As shown in FIG. 4, the sleeve surrounds a portion of the pole that support birdfeeders and is suspended by a rubber band. The lower end of the rubber band is bonded to an inner surface of the sleeve, while the upper end is attached to a fixed location on the pole above the sleeve. This configuration allows the device to remain in a resting position until external weight is applied. A truncated cone, as shown prominently in FIGS. 1-4, is flexibly secured to the upper end of the sleeve.

Figure 5:
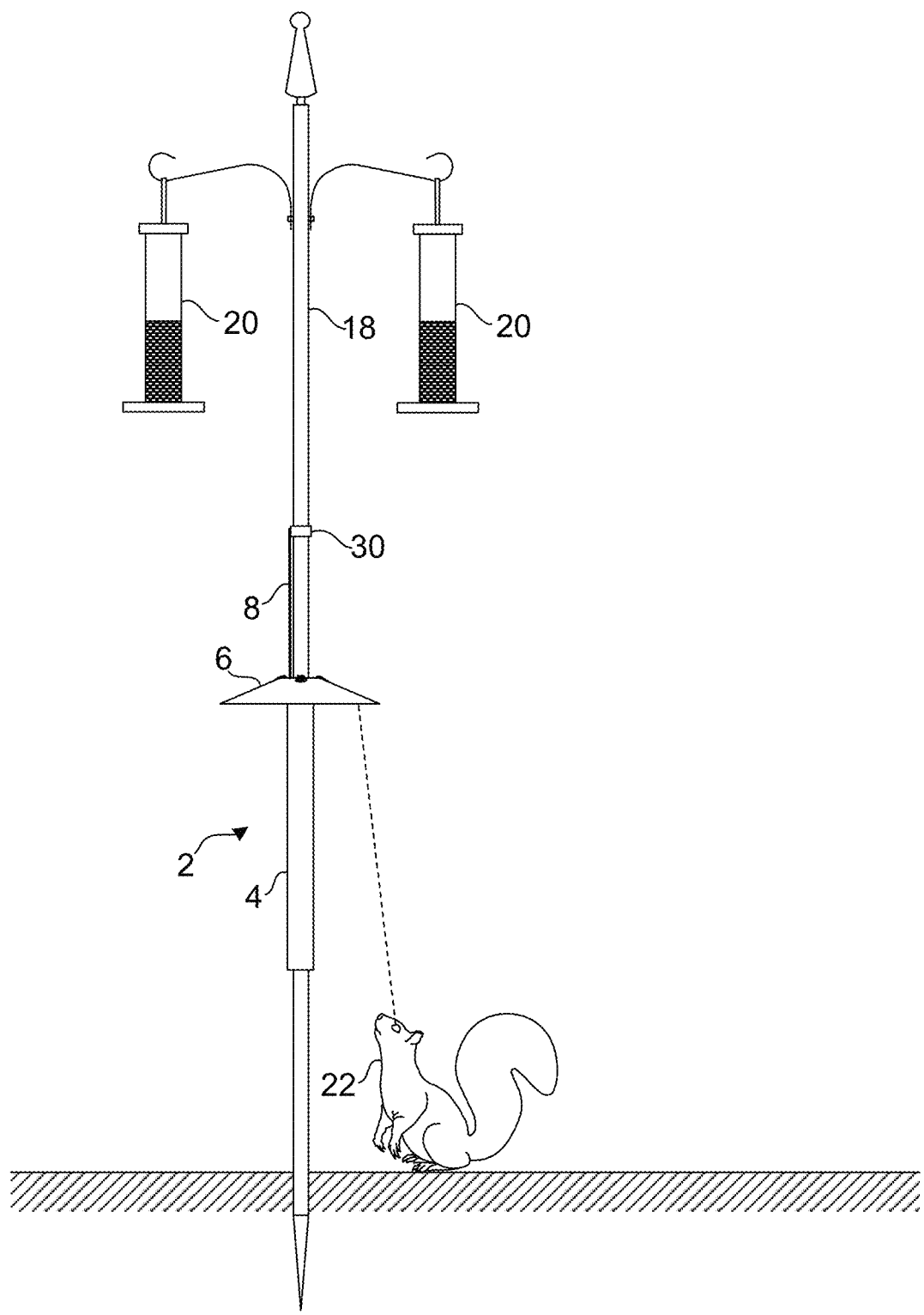
FIG. 5 is a diagram depicting one scenario in which a squirrel deterrent device is useful for deterring a squirrel.
Figure 6:
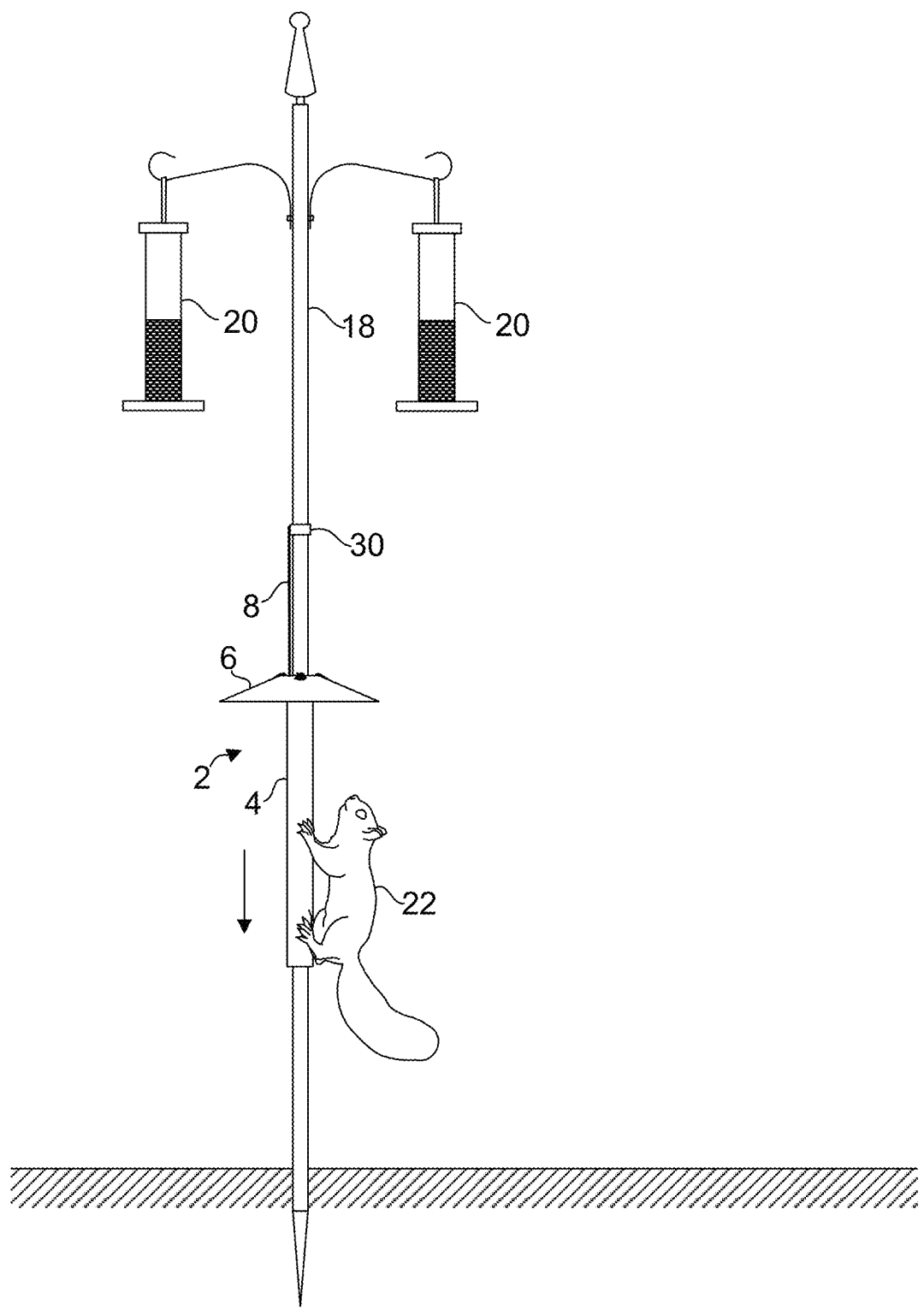
FIG. 6 is a diagram depicting one scenario in which a squirrel deterrent device is useful for deterring an advancing squirrel.
Figure 7:
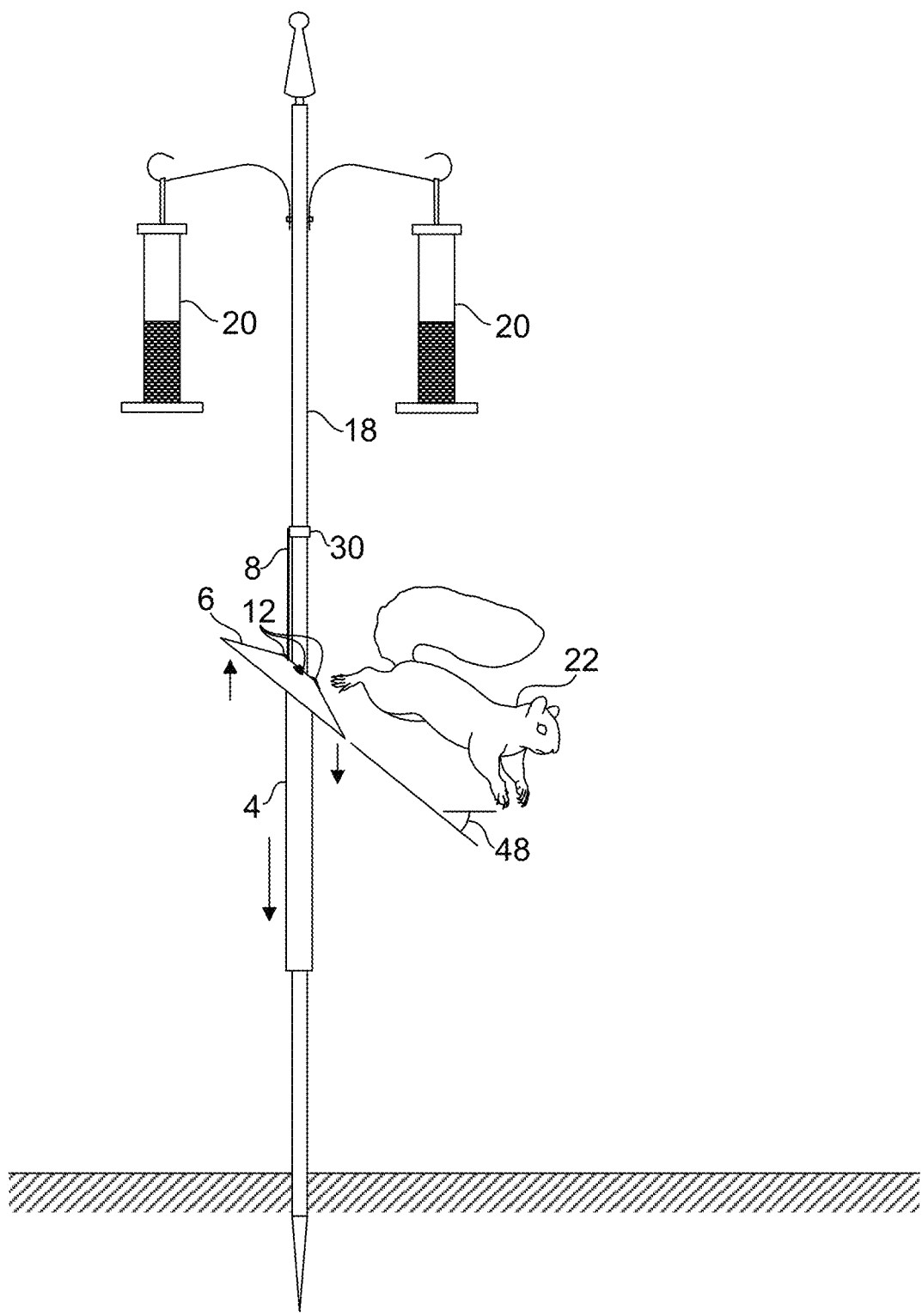
FIG. 7 is a diagram depicting one scenario in which a present squirrel deterrent device is useful for deterring a squirrel using the present squirrel deterrent device as a perch.

FIGS. 5-7 illustrate the device in operation. FIG. 5 is a diagram depicting one scenario in which a squirrel deterrent device is useful for deterring a squirrel. A squirrel is shown approaching the device, which acts as a barrier for the squirrel to ascend the pole. When viewed from in the vicinity of the pole, the protruding nature of the cone serves as a warning to the squirrel that a barrier exists if its ascent of the pole is intended. Applicant discovered that a cone-shaped provides a barrier that appears sufficiently large at its bottom periphery to dissuade squirrels from attempting ascents and bypassing the device 2 while not requiring a supporting structure for the barrier that is overly large, e.g., in the case of a dome. In other words, to achieve a similarly-sized base, the curved portion of a dome would require a significantly larger amount of material and a significantly larger spatial envelope. The truncated cone includes a top opening defined by a smaller diameter 34 and a bottom opening defined by a larger diameter 36. In one embodiment, the larger diameter 36 measures about 10 to about 12 inches and the height 38 of the cone measures about 2 to about 2.5 inches. Furthermore, the uniformly-sloped surface of the cone allows rainwater to run off easily and causes squirrels to slide off more readily, especially when the cone is made of aluminum, a metal that provides a naturally smooth surface even without additional treatment. If a squirrel is still undeterred upon noticing the cone or if it fails to notice the cone while on the ground, it is likely to proceed climbing up the pole and eventually arriving at the sleeve 4 of the device 2 as shown in FIG. 6. FIG. 6 is a diagram depicting one scenario in which a squirrel deterrent device is useful for deterring an advancing squirrel. Here, the weight of the squirrel triggers downward movement of the sleeve, increasing the gap between the device and a birdfeeder. This movement discourages continued ascent. When the squirrel attempts to climb the pole and applies its weight to the sleeve or the attached cone, the rubber band stretches, allowing the sleeve to descend downwardly even when only a portion of the weight has been applied to the sleeve 4. This downward motion increases the distance from any supported birdfeeders and destabilizes the animal's footing, causing the animal to back down or otherwise evade the sleeve 4. FIG. 7 is a diagram depicting one scenario in which a present squirrel deterrent device is useful for deterring a squirrel using the present squirrel deterrent device as a perch. The cone 6 serves both as a physical barrier as its edge protrudes from the pole upon which the device 2 is mounted and an active destabilizing surface if the squirrel 22 applies its weight directly to the cone 6. When an animal attempts to perch on or bypass the cone 6, the cone 6 is designed to tilt downwardly on the weighted side by a tilt angle 48 of about 70 to about 80 degrees from its horizontal resting position. This is illustrated in FIG. 7, where the cone's shift in orientation effectively dislodges the animal 22 from the device 2. The wobbling and tilting motion, combined with the sudden drop caused by the rubber band's extension, denies the animal any stable foothold, urging the animal 22 to jump off the cone 6. Upon removal of the animal's weight, the elastic tension in the rubber band 8 and rubber bands 12, cause the cone and sleeve to return to their original resting positions, making the system repeatable and maintenance-free. The present animal deterrent device has been field-tested under typical outdoor conditions. During such testing, no rodents, e.g., squirrels, chipmunks, etc., were observed to successfully access the birdfeeders mounted on the pole even after more than fifty observed attempts. The consistent performance of the device in field conditions demonstrates its reliability and practical effectiveness.

Figure 8:
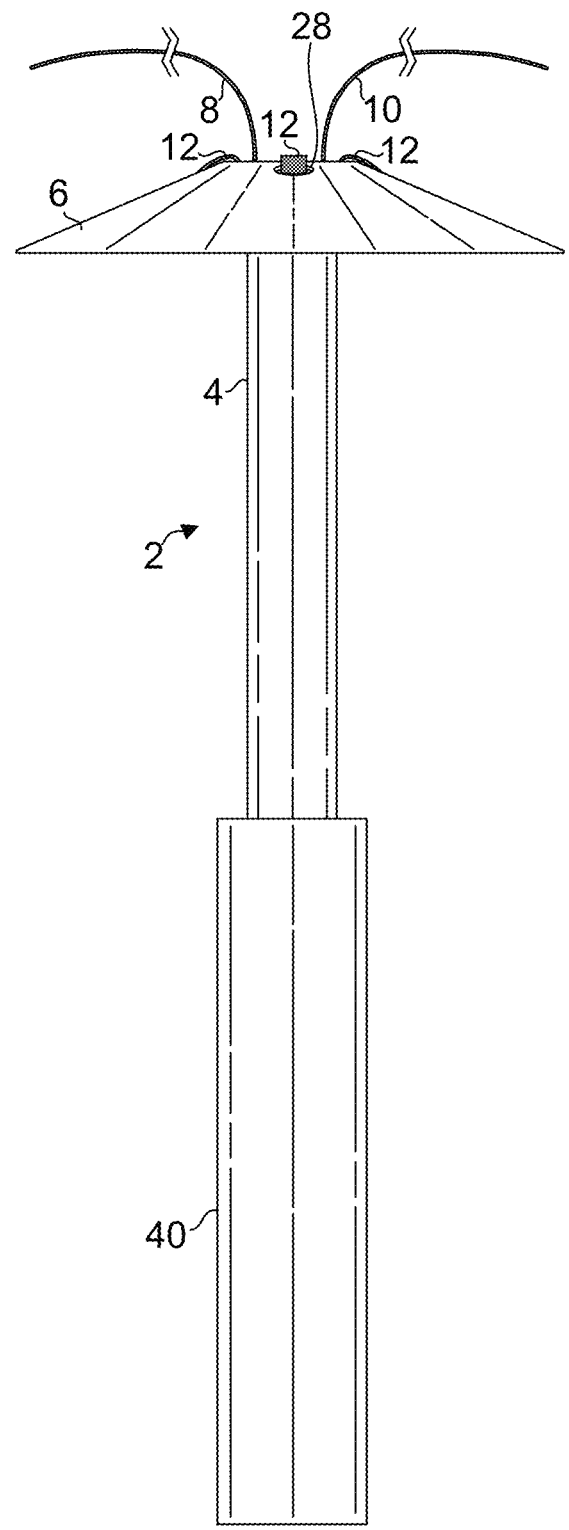
FIG. 8 is a side view of another embodiment of a squirrel deterrent device.
Figure 9:
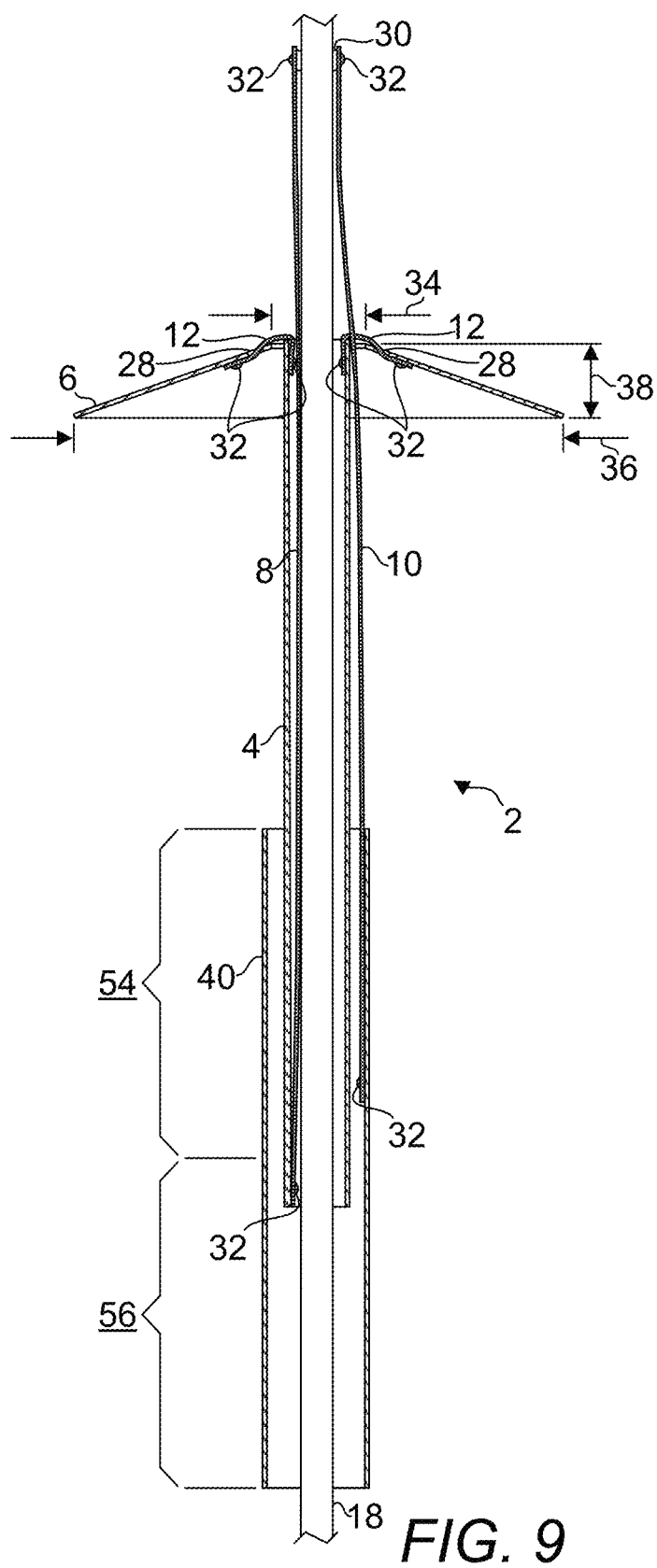
FIG. 9 is a side cross-sectional view of the squirrel deterrent device of FIG. 8 thereof.

In instances where a birdfeeder must be supported at a reduced height, the likelihood of encounters with squirrels capable of overcoming a deterrent device increases. In such cases, implementation of a more articulated and extensive deterrent system can further reduce the likelihood of a breach of the device illustrated in FIGS. 1-7 by further minimizing the pole surface area available to the animals and introducing an additional destabilizing mechanism. FIG. 8 is a side view of another embodiment of a squirrel deterrent device 2 useful for deterring animals when a birdfeeder is supported at a decreased height. FIG. 9 is a side cross-sectional view of the squirrel deterrent device 2 of FIG. 8 thereof. The device 2 shown in FIGS. 8 and 9, further includes a second sleeve 40 including an upper half 54 and a bottom half 56. The second sleeve 40 is configured to be mountable around a portion of the first sleeve 4 such that the second sleeve is movable along a second portion of the length of the pole, wherein the second sleeve is supported on the pole by connecting a first end of a third elastic member to the pole and a second end of the third elastic member to a location at the upper half of the second sleeve 4. The second sleeve 40 includes an inner diameter that is slightly larger than the first sleeve 4 and overlaps a lower portion of the first sleeve 4. In one embodiment, the second sleeve includes an inner diameter of about 2 to about 2.5 inches and a length of about 20 to about 21 inches. The second sleeve 40 is configured to be attached to the pole 18 using a second elastic member 10, e.g., rubber band, fixed similarly by means of a clamp 30, weather-resistant tape or by tying one end of the rubber band 10 to the same pole 18. The second elastic member 10 is configured such that when a squirrel causes a descent of the second sleeve 40, the top portion of the second sleeve 40 does not clear the bottom portion of the first sleeve 4 to avoid the potential for the second sleeve 40 to interfere with the first sleeve 4. When an animal 22 applies weight to the lower sleeve, it descends under the first sleeve 4, further removing the animal from the vicinity of a birdfeeder 20 at an earlier stage and reducing the available pole surface area for ascending the pole. Both sleeves 4, 40 operate independently but synergistically, each connected to the pole by its own rubber band 8, 10. This modified configuration enhances deterrence while maintaining the simplicity and durability of the device embodiment shown in FIGS. 1-7 by significantly reducing any remaining chance for access to the birdfeeder/s. The addition of a second sleeve increases the overall length of the device, preventing a squirrel from leaping directly from the ground to the pole above the baffle, as the cone is mounted at a higher position along the pole.

Figure 10:
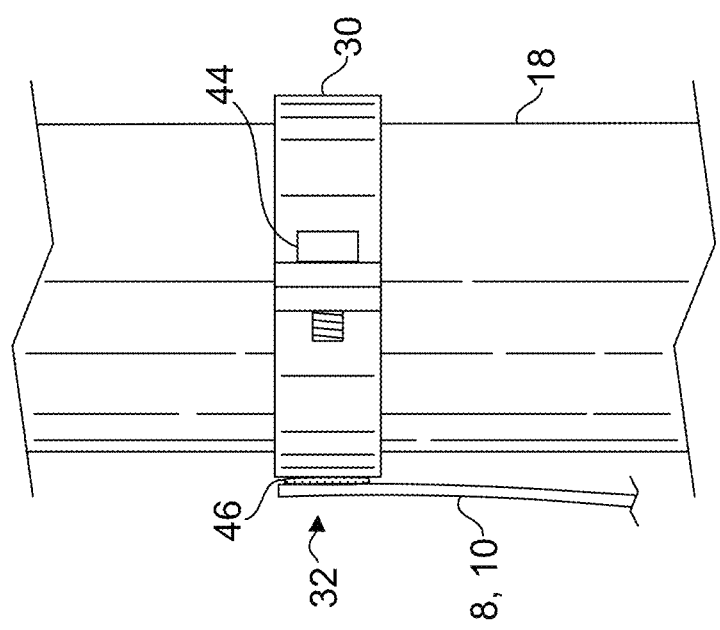
FIG. 10 is a diagram depicting a manner in which one end of a rubber band is secured to a pole.

FIG. 10 is a diagram depicting a manner in which one end of a rubber band 8, 10 is secured to a pole 18. One end of a first elastic member 8 is first secured to a clamp 30 at an attachment point 32 using an adhesive, e.g., glue 46. After the glue has fully cured, the clamp 30 can be disposed around the pole 18 at a suitable location of the pole 18 before the clamp 30 is tightened against the pole by tightening the fastener 44 of the clamp 30. In an embodiment not shown, a weather-resistant tape may be used in place of a clamp. Again, if a weather-resistant tape is used, the rubber bands 8, 10 may be secured to the pole 18 by taping one end of each rubber band 8, 10 to the pole 18.

Figure 11:
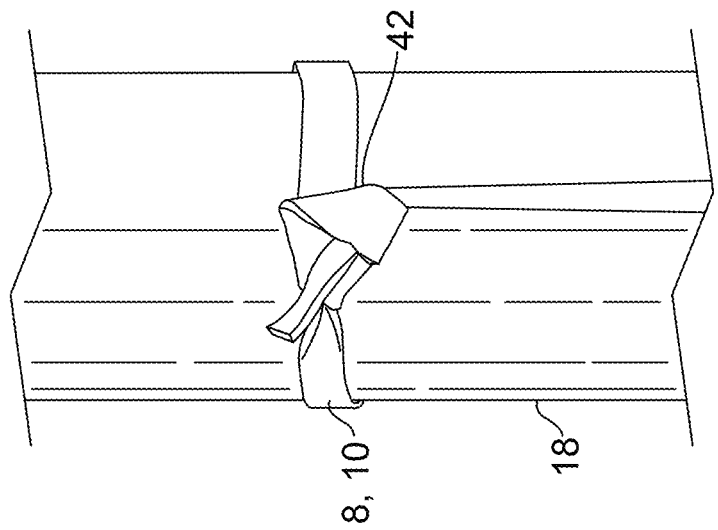
FIG. 11 is a diagram depicting another manner in which one end of a rubber band is tied to a pole.

FIG. 11 is a diagram depicting another manner in which one end of a rubber band is tied to a pole 18. As an alternative to using a clamp, the rubber band may be secured to the pole by tying one end into a knot 42, though this configuration may offer reduced security compared to clamping. While one end of the elastic member may be secured to a clamp using adhesive or tied directly to the pole, other attachment techniques may also be used, provided they achieve a similar functional result, without departing from the intended scope of the invention.

Figure 12:
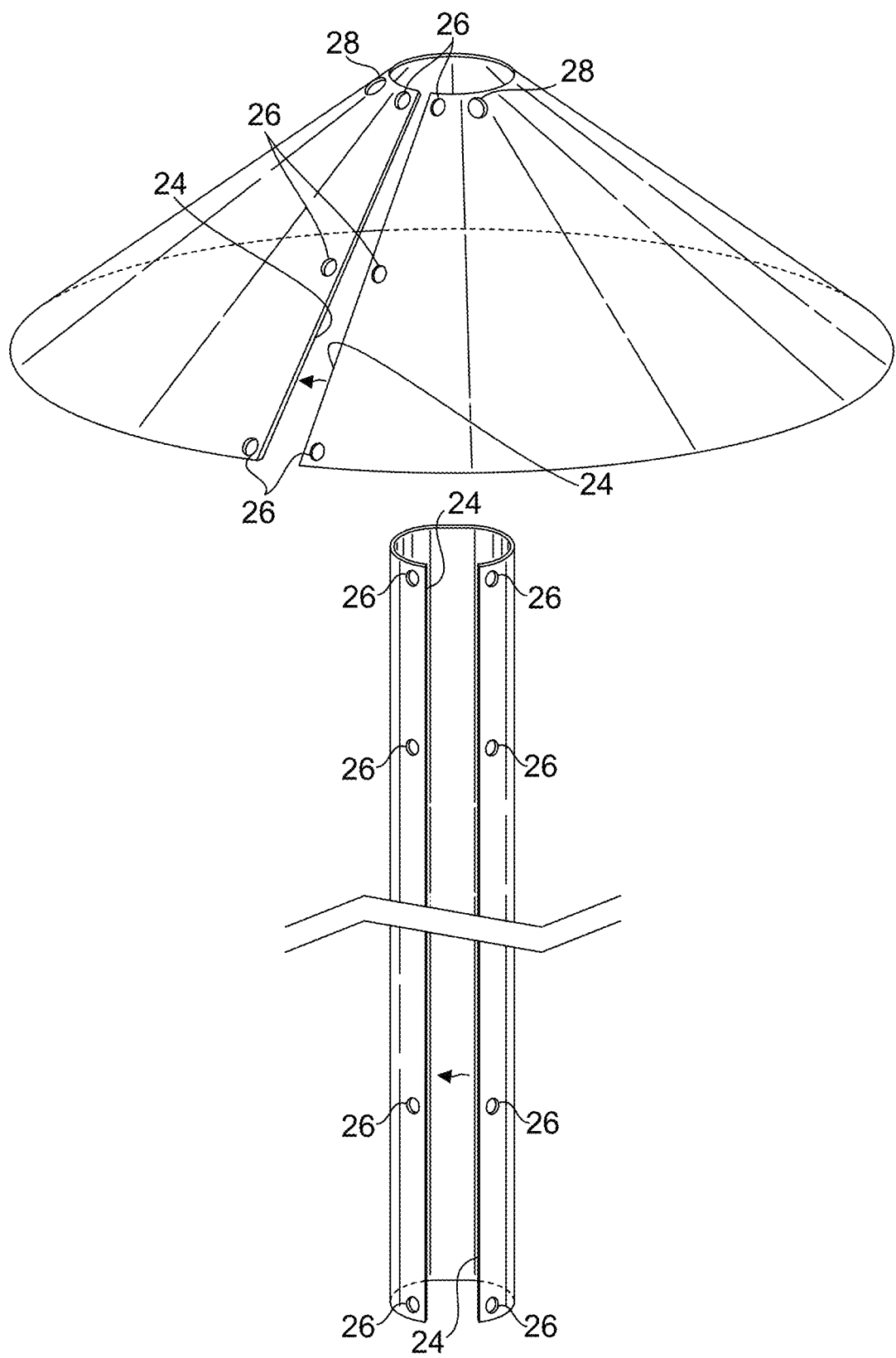
FIG. 12 is a diagram depicting one embodiment of a squirrel deterrent device suitable to be installed on a ground-mounted pole without first removing the pole.

FIG. 12 is a diagram depicting one embodiment of a squirrel deterrent device suitable to be installed on a ground-mounted pole without first removing the pole. For simplicity, no elastic member 12 is shown connecting the baffle 6 and the first sleeve 4. A birdfeeder typically comes in the form of a pole with one or more cross arms extending from an upper portion of the pole and therefore it would not be feasible to attempt sliding a device with an annular opening from the upper end of the pole. Here, each of the baffle 6 and the first sleeve 4 is configured to include a lateral split flanked by lap edges 24, each having matching apertures 26 configured to receive fasteners (not shown). Upon placing each of the baffle 6 and the first sleeve 4 around a pole, the fasteners can be used to secure the overlapping lap edges 24 together to form a structurally secure seam.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to baffle any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An animal deterrent device configured to be mountable to a pole to dissuade the use of the pole by an animal, said animal deterrent device comprising:
   (a) a first elastic member comprising an unstretched length;
   (b) a first sleeve comprising a lumen, a top end and a bottom end, said first sleeve configured to be mountable around the pole such that said first sleeve is movable along a first portion of the length of the pole, wherein said first sleeve is supported on the pole by connecting said bottom end of said first sleeve through said lumen to a portion of the pole; and
   (c) a baffle configured to be movably mounted with respect to said top end of said first sleeve such that said baffle is tiltable relative to said first sleeve,
wherein when the weight of the animal is applied to the first sleeve, the length of said first elastic member expands to cause said first sleeve to drop with respect to the pole to dissuade the animal from ascending the pole and when the weight of the animal is applied to said baffle directly, the length of said first elastic member expands to cause said baffle to drop and tilt to cause the animal to lose its balance to dissuade the animal from using the baffle as a perch.

2. The animal deterrent device according to claim 1, wherein said first elastic member is constructed from a rubber band.

3. The animal deterrent device according to claim 1, wherein said first elastic member comprises ethylene propylene diene monomer (EPDM).

4. The animal deterrent device according to claim 1, wherein said baffle is configured to be movably mounted to said top end of said sleeve using one or more second elastic members.

5. The animal deterrent device according to claim 1, wherein said baffle is shaped as a truncated cone.

6. The animal deterrent device according to claim 5, wherein said truncated cone comprises a top opening defined by a first diameter and a bottom opening defined by a second diameter, the second diameter measures about 10 to about 12 inches.

7. The animal deterrent device according to claim 1, wherein at least one of said baffle and said first sleeve is constructed from aluminum.

8. The animal deterrent device according to claim 1, wherein said first sleeve comprises an inner diameter of about 1 to about 1.5 inches and a length of about 20 to about 21 inches.

9. The animal deterrent device according to claim 1, further comprising a second sleeve comprising an upper half and a bottom half, said second sleeve configured to be mountable around said first sleeve such that said second sleeve is movable along a second portion of the length of the pole, wherein said second sleeve is supported on the pole by connecting a first end of a third elastic member to the pole and a second end of the third elastic member to a location at said upper half of said second sleeve.

10. The animal deterrent device according to claim 9, wherein said second sleeve comprises an inner diameter of about 2 to about 2.5 inches and a length of about 20 to about 21 inches.

11. The animal deterrent device according to claim 1, wherein said unstretched length is about 12 to about 14 inches.

12. An animal deterrent device configured to be mountable to a pole to dissuade the use of the pole by an animal, said animal deterrent device comprising:
   (a) a first elastic member comprising an unstretched length;
   (b) a first sleeve comprising a lumen, a top end and a bottom end, said first sleeve configured to be mountable around the pole such that said first sleeve is movable along a first portion of the length of the pole, wherein said first sleeve is supported on the pole by connecting said bottom end of said first sleeve through said lumen to a portion of the pole; and
   (c) a baffle configured to be moveably mounted with respect to said top end of said first sleeve such that said baffle is tiltable relative to said first sleeve, wherein said baffle comprises a truncated cone comprising a top opening defined by a first diameter and a bottom opening defined by a second diameter, the second diameter measures about 10 to about 12 inches and said width of said baffle dissuades the animal from ascending the pole and when the weight of the animal is applied to the first sleeve, the length of said first elastic member expands to cause said first sleeve to drop with respect to the pole to dissuade the animal from ascending the pole and when the weight of the animal is applied to said baffle directly, the length of said first elastic member expands to cause said baffle to drop and tilt to cause the animal to lose its balance to dissuade the animal from using the baffle as a perch.

13. The animal deterrent device according to claim 12, wherein said baffle is configured to be movably mounted to said top end of said sleeve.

14. The animal deterrent device according to claim 12, wherein said first elastic member is constructed from a rubber band.

15. The animal deterrent device according to claim 12, wherein said baffle is shaped as a truncated cone.

16. The animal deterrent device according to claim 12, wherein at least one of said baffle and said first sleeve is constructed from aluminum.

17. The animal deterrent device according to claim 12, wherein said first sleeve comprises an inner diameter of about 1 to about 1.5 inches and a length of about 20 to about 21 inches.

18. The animal deterrent device according to claim 12, further comprising a second sleeve comprising an upper half and a bottom half, said second sleeve configured to be mountable around said first sleeve such that said second sleeve is movable along a second portion of the length of the pole, wherein said second sleeve is supported on the pole by connecting a first end of a third elastic member to the pole and a second end of the third elastic member to a location at said upper half of said second sleeve.

19. The animal deterrent device according to claim 18, wherein said second sleeve comprises an inner diameter of about 2 to about 2.5 inches and a length of about 20 to about 21 inches.

20. The animal deterrent device according to claim 12, wherein said unstretched length is about 12 to about 14 inches.

* * * * *